Figure 1:
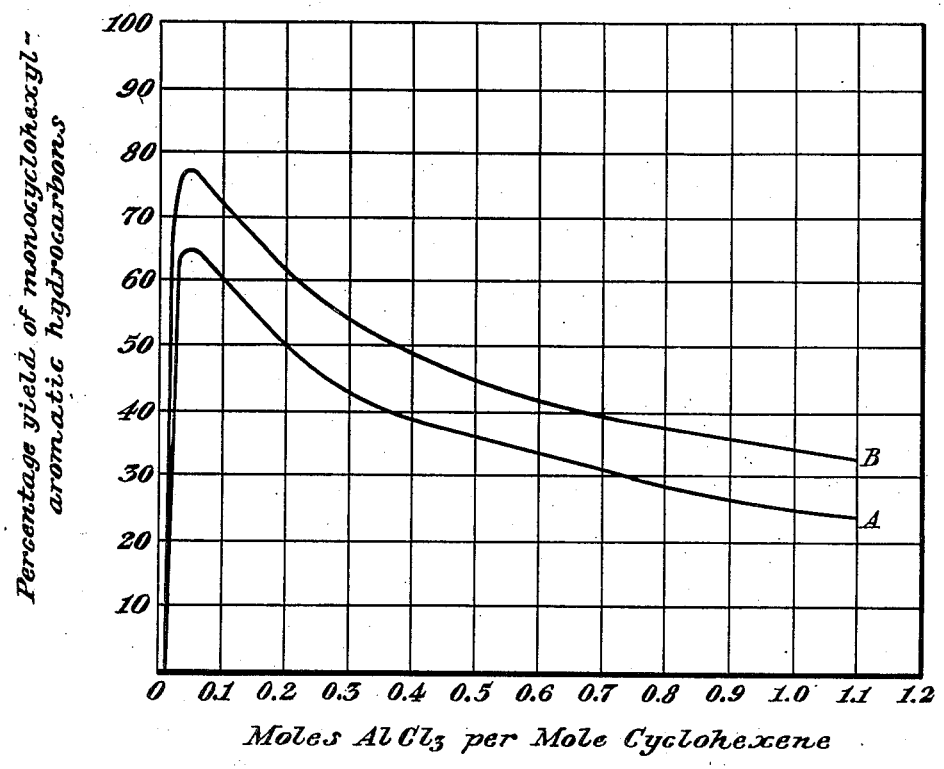

Patented Aug. 14, 1934

UNITED STATES PATENT OFFICE

1,969,984

CYCLOHEXYL-AROMATIC HYDROCARBON

Lawrence F. Martin and Gerald H. Coleman, Midland, Mich., assignors to The Dow Chemical Company, Midland, Mich., a corporation of Michigan Application May 31, 1932, Serial No. 614,410

3 Claims. (Cl. 260—161)

The present invention concerns an improved method of reacting cyclohexene with aromatic hydrocarbons, particularly with chlorinated aromatic hydrocarbons, to obtain the monocyclohexyl derivatives of the latter in relatively high yield.

The present application is a continuation in part of our prior application, Serial No. 424,443, filed January 29, 1930, for "Halogenated aliphatic-aromatic hydrocarbons and method of making same".

It is known that cyclohexene may be reacted with various aromatic hydrocarbons (e. g. benzene, xylene, etc.) in the presence of a considerable quantity of aluminum chloride (i. e. at least 0.3 mol of aluminum chloride for each mol of cyclohexene used) to form the corresponding monocyclohexyl - aromatic hydrocarbons. The general type of reaction involved may be represented by the following equation for the formation of monocyclohexyl-benzene from benzene and cyclohexene:—

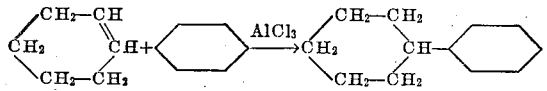

However, in preparing a monocyclohexyl-aromatic hydrocarbon according to such usual method, a considerable portion of the reactants employed are lost through the formation of by-products, e. g. polycyclohexyl-aromatic hydrocarbons, so that the desired monocyclohexyl-aromatic hydrocarbon is obtained in relatively low yield.

We have now found that, if cyclohexene is reacted with an aromatic hydrocarbon in the presence of a materially smaller quantity of aluminum chloride or corresponding aluminum halide than that heretofore used, preferably between about 0.02 and about 0.25 mol of aluminum halide per mol of cyclohexene used, a monocyclohexyl-aromatic hydrocarbon is produced in much higher yield, the relative quantity of by-products, e. g. polycyclohexyl-aromatic hydrocarbons, formed during reaction being reduced to a corresponding extent. We have found, furthermore, that the employment of such relatively small quantity of aluminum halide is particularly advantageous in reacting cyclohexene with a chlorinated aromatic hydrocarbon, in that the relative yield of the desired monocyclohexyl-chlorinated aromatic hydrocarbon is increased to an especially great extent over the yield obtainable when the reaction is carried out under similar operating conditions in the presence of a relatively large quantity of the same aluminum halide as a catalyst.

To the accomplishment of the foregoing and related ends, our invention consists of the method hereinafter fully described and particularly pointed out in the claims, the following description and the accompanying drawing setting forth in detail several of the various ways in which the principle of our invention may be used.

In the accompanying drawing, Fig. 1 is a graph showing the yields of monocyclohexyl-chlorobenzene obtained through reacting cyclohexene with monochloro-benzene in the presence of various quantities of aluminum chloride as catalysts, the quantities of the latter being expressed as mols of aluminum chloride per mol of cyclohexene used. Curve A of Fig. 1 represents the yields of monocyclohexyl-chlorobenzene obtainable through employing monochlorobenzene and cyclohexene in a molecular ratio of 3 mols of the former reactant to 1 mol of the latter, the reactions being carried out in the presence of the quantities of aluminum chloride indicated and at a temperature between 35° and 45° C. Curve B of Fig. 1 represents data collected from runs made under similar operating conditions except that monochlorobenzene and cyclohexene were employed in a molecular ratio of 5 mols of the former compound to 1 mol of the latter.

From Fig. 1 two principles, which we have found to be general for the reaction of cyclohexene with aromatic hydrocarbons (e. g. benzene, toluene, xylene, naphthalene, diphenyl, monochlorobenzene, ortho-dichlorobenzene, monochlorodiphenyl, etc.) as a class, may be observed, viz.; (1) for a given ratio of an aromatic hydrocarbon to cyclohexene and for a given reaction temperature, yields are maximum when between about 0.02 and about 0.25 mol of an aluminum halide per mol of cyclohexene is used in carrying out the reaction; (2) for a given ratio of an aluminum halide to cyclohexene and for a given reaction temperature, yields of the monocychlohexyl-aromatic hydrocarbon product become higher as the molecular ratio of aromatic hydrocarbon to cyclohexen is increased. The second of the above generalizations holds within the ranges which have been tested and within the ranges which would be employed in carrying out such reaction on a commercial scale. In practicing our invention we prefer to employ between about 3 and about 7 mols of aromatic hydrocarbon for each mol of cyclohexene used and we find it most advantageous to employ between 5 and 6 mols of the aromatic hydrocarbon for each mol of cyclohexene used.

The following table of examples sets forth the operating conditions employed and the yields of monocyclohexyl-aromatic hydrocarbons obtained through reacting cyclohexene with aromatic hydrocarbons in the presence of various quantities of aluminum chloride as catalyst. It is to be understood that said examples are illustrative of but several of the various ways in which the principle of the invention may be used and are not to be construed as a limitation on the invention.

The procedure described below was employed in carrying out the experiments described in the table of examples.

Into a 3 necked, round bottom flask provided with a mechanical stirrer, a dropping funnel, and a reflux condenser fitted with a drying tube containing calcium chloride, were placed the desired quantities of aluminum chloride and an aromatic hydrocarbon. The mixture was then stirred while the desired quantity of cyclohexene was slowly introduced thereto by means of the dropping funnel. The reaction usually started immediately upon introducing the cyclohexene to the mixture, the temperature rising spontaneously during reaction and being controlled by regulating the rate of introduction of cyclohexene. After all of the cyclohexene had been admitted to the mixture, stirring was continued, usually for about 15 minutes, and then cooled to room temperature and poured into 1 liter of an aqueous solution containing 50 cubic centimeters of concentrated hydrochloric acid. After shaking thoroughly with the dilute acid solution, the organic layer was separated, dried, and fractionally distilled to separate the mono-cyclohexyl-aromatic hydrocarbon in substantially pure form. In some instances the final fractional distillation step was preceded by a steam distillation of the crude reaction mixture to separate relatively volatile unreacted compounds therefrom, but such steam distillation step is in no case necessary as the unreacted materials may be separated from the desired products by fractionally distilling the mixture in the usual way.

In the following table of examples, the percentage yields listed are the percentage yields of monocyclohexyl-aromatic hydrocarbon products, based on the quantities of cyclohexene employed in preparing said products. Also, in those experiments marked "500 c.c. of $CS_2$", the reactions were each carried out in the presence of 500 cubic centimeters of carbon bisulphide as a reaction solvent.

going table of examples, it may be seen that when cyclohexene and an aromatic hydrocarbon, which may or may not be substituted by chlorine, are employed in a given molecular ratio and are reacted in the presence of aluminum chloride at a given temperature, the yield of monocyclohexyl product formed is dependent, for the most part, upon the relative quantities of aluminum chloride and cyclohexene employed. The yield is highest when between about 0.02 and about 0.25 mol of aluminum chloride is employed for each mol of cyclohexene used. A comparison of curve A with curve B in Fig. 1 of the accompanying drawing and a comparison of experiments 1 to 6 with experiments 9 to 13 in the table of examples shows that when aluminum chloride and cyclohexene are employed in a given molecular ratio and comparative reactions are carried out at substantially the same temperature, the yield of monocyclohexyl-aromatic hydrocarbon product becomes higher as the molecular ratio of the aromatic hydrocarbon reactant to cyclohexene is increased. The last mentioned generalization holds accurately up to a molecular ratio of about 7 mols of hydrocarbon to about one mol of cyclohexene used and apparently also holds true at higher ratios. The two generalizations set forth above are of fundamental importance in carrying out a reaction between cyclohexene and an aromatic hydrocarbon and hold rigidly for all aromatic hydrocarbons capable of being reacted with cyclohexene in the presence of aluminum chloride.

Comparative experiments 7, 8 and 9, in the table of examples, illustrate further the second generalization mentioned above, viz.:—that for a given molecular ratio of aluminum chloride to cyclohexene, the yield of monocyclohexyl aromatic hydrocarbon product becomes higher as the molecular ratio of the aromatic hydrocarbon to cyclohexene is increased. A comparison of run 22 with run 23 illustrates the fact that this generalization holds true, even when an inert solvent, e. g. carbon bisulfide, is employed in carrying out the reaction.

Comparative experiments 18, 19, and 20, in the

*Table of examples*

| Exp't. No. | Mols of $C_6H_{10}$ | Organic hydrocarbon | | Mols of $AlCl_3$ | Mol ratio of $\frac{AlCl_3}{C_6H_{10}}$ | Mol ratio of— Aromatic hydrocarbon $\frac{}{C_6H_{10}}$ | Reaction temperature °C. | Percentage yield | Remarks |
|---|---|---|---|---|---|---|---|---|---|
| | | Compound | Mols | | | | | | |
| 1 | 1.0 | Monochlorobenzene | 3.0 | 0.010 | 0.010 | 3.0 | 25–30 | | No reaction. |
| 2 | 1.0 | ----do---- | 3.0 | 0.025 | 0.025 | 3.0 | 35–45 | 57.8 | |
| 3 | 1.0 | ----do---- | 3.0 | 0.050 | 0.050 | 3.0 | 35–45 | 64.5 | |
| 4 | 1.0 | ----do---- | 3.0 | 0.550 | 0.550 | 3.0 | 35–45 | 34.5 | |
| 5 | 1.0 | ----do---- | 3.0 | 1.100 | 1.100 | 3.0 | 35–45 | 23.3 | |
| 6 | 1.0 | ----do---- | 3.0 | 1.100 | 1.100 | 3.0 | 130–135 | 13.6 | |
| 7 | 1.0 | ----do---- | 2.0 | 0.025 | 0.025 | 2.0 | 35–45 | 44.2 | |
| 8 | 1.0 | ----do---- | 4.0 | 0.025 | 0.025 | 4.0 | 35–45 | 64.7 | |
| 9 | 1.0 | ----do---- | 5.0 | 0.025 | 0.025 | 5.0 | 35–45 | 64.9 | |
| 10 | 1.0 | ----do---- | 5.0 | 0.050 | 0.050 | 5.0 | 35–45 | 77.0 | |
| 11 | 1.0 | ----do---- | 5.0 | 0.025 | 0.025 | 5.0 | 38–41 | 57.3 | |
| 12 | 1.0 | ----do---- | 5.0 | 0.500 | 0.500 | 5.0 | 36–40 | 45.0 | |
| 13 | 1.0 | ----do---- | 5.0 | 1.000 | 1.000 | 5.0 | 35–45 | 34.1 | |
| 14 | 1.0 | Ortho-dichloro-benzene | 5.0 | 0.100 | 0.100 | 5.0 | 38–42 | 46.5 | |
| 15 | 0.5 | Ortho-chlorotoluene | 2.5 | 0.050 | 0.100 | 5.0 | 39–40 | 59.7 | |
| 16 | 1.0 | Para-chlorodiphenyl | 2.0 | 0.150 | 0.150 | 2.0 | 27–41 | 61.2 | 500 c.c. of $CS_2$. |
| 17 | 1.0 | Alpha-chloronaphthalene | 5.0 | 0.100 | 0.100 | 5.0 | 26–40 | 54.8 | |
| 18 | 1.0 | Benzene | 3.0 | 0.010 | 0.010 | 3.0 | 40–50 | 31.7 | |
| 19 | 0.5 | ----do---- | 1.5 | 0.050 | 0.100 | 3.0 | 40–50 | 65.8 | |
| 20 | 1.0 | ----do---- | 3.0 | 1.100 | 1.100 | 3.0 | 40–50 | 33.2 | |
| 21 | 1.0 | ----do---- | 5.0 | 0.050 | 0.050 | 5.0 | 39–43 | 78.5 | |
| 22 | 1.0 | Naphthalene | 1.0 | 0.200 | 0.200 | 1.0 | 35–45 | 27.1 | 500 c.c. of $CS_2$. |
| 23 | 1.0 | ----do---- | 2.0 | 0.200 | 0.200 | 2.0 | 35–45 | 42.7 | 500 c.c. of $CS_2$. |
| 24 | 0.5 | Diphenyl | 2.5 | 0.025 | 0.050 | 5.0 | 38–39 | 66.9 | 500 c.c. of $CS_2$. |
| 25 | 1.0 | Toluene | 5.0 | 0.050 | 0.050 | 5.0 | 38–42 | 80.4 | |

From Fig. 1 of the accompanying drawing and from experiments 1 to 6 and 9 to 13 in the foregoing table of examples, further substantiate one of the foregoing generalizations and illustrate the fact that when cyclohexene and benzene, in given molecular ratio, are reacted in the presence of aluminum chloride, the yield of monocyclohexyl-benzene product is highest when between about 0.02 and about 0.25 mol of aluminum chloride per mol of cyclohexene is employed in carrying out the reaction. Comparison of experiment 19 with experiment 21 shows that when cyclohexene is reacted with benzene in the presence of aluminum chloride and the molecular ratio of aluminum chloride to cyclohexene is held constant the yield of monocyclohexyl-benzene product becomes higher as the molecular ratio of benzene to cyclohexene is increased.

While, in the examples and in the foregoing generalizations, aluminum chloride has specifically been referred to as a catalyst, and while we prefer to employ aluminum chloride as a catalyst in practicing our invention, it shall be understood that the generalizations set forth above are applicable to the employment of any aluminum halide as a catalyst in effecting the condensation of cyclohexene with an aromatic hydrocarbon. For instance, when cyclohexene and benzene, in a given molecular ratio, are reacted, at a given temperature and in the presence of aluminum bromide as catalyst, to form monocyclohexyl-benzene, the yield of the latter is highest when between about 0.02 and about 0.25 mol of aluminum bromide per mol of cyclohexene is used.

As might be expected, a mixture of isomeric monocyclohexyl aromatic hydrocarbons is frequently formed when cyclohexene is reacted with an aromatic hydrocarbon containing one or more substituents, and such mixture of isomeric products often can be separated only with extreme difficulty. The yields of monocyclohexyl products set forth in the table of examples represent, in many instances, the yields of such mixed isomers. Benzene, of course, forms but a single monocyclohexyl product.

The following monocyclohexyl-aromatic hydrocarbons, set forth in the table of examples, are new compounds or mixtures of isomeric new compounds:—a mixture of isomeric monocyclohexyl-para-chlorodiphenyls boiling at between about 193° and about 203° C. under 2 millimeters pressure; a mixture of monocyclohexyl-alpha-chloronaphthalenes boiling at between about 165° and about 185° C. under 2 millimeters pressure; a mixture of isomeric mono-cyclohexyl-ortho-chlorotoluenes boiling at between about 115° and about 117° C. under 3 millimeters pressure; a mixture of isomeric monocyclohexyl-ortho-dichloro-benzenes boiling at between about 134° and about 137° C. under 3.5 millimeters pressure; a mixture of isomeric monocyclohexyl-naphthalenes boiling between about 162° and about 175° C. under 5 millimeters pressure; and a mixture of isomeric monocyclohexyl-diphenyls boiling at between about 155° and 186° C. under 3 millimeters pressure.

From the mixture of isomeric monocyclohexyl-diphenyls we have separated, through a series of fractional crystallization and fractional distillation steps, a monocyclohexyl-diphenyl (probably 4-cyclohexyl-diphenyl) melting at about 76.6–77.6° C. and boiling at about 169–171° C. under 3 millimeters pressure. Through similar procedure we have separated from the mixture of isomeric monocyclohexyl para-chloro-diphenyls (1) a monocyclohexyl para-chloro-diphenyl melting at about 55° C. and boiling at about 197–199° C. under 4.5 millimeters pressure, and (2) an isomeric compound melting at about 143.6–144.6° C. and boiling at about 200° C. under 3 millimeters pressure. In similar manner we have separated, from the mixture of isomeric monocyclohexyl-naphthalenes (1) an isomer melting at about 30.2–31.4° C., said isomer being probably alpha-cyclohexyl-naphthalene, and (2) an isomer melting at about 150–152° C., the latter being probably beta-cyclohexyl-naphthalene. All of the solid isomers isolated were obtained in the form of silver-colored, leaf-like crystals.

The present invention, in brief, comprises reacting cyclohexene with an aromatic hydrocarbon or chlorinated aromatic hydrocarbon in the presence of between about 0.02 and about 0.25 mol of aluminum chloride per mol of cyclohexene used.

Other modes of applying the principle of our invention may be employed instead of those explained, change being made as regards the method and products herein disclosed, provided the means stated by any of the following claims or the equivalent of such stated means be employed.

We therefore particularly point out and distinctly claim as our invention:—

1. The improvement in the method of preparing a mono-cyclohexyl-aromatic compound which comprises reacting cyclohexene with a compound selected from the class consisting of aromatic hydrocarbons and chlorinated aromatic hydrocarbons in the presence of about 0.05 mol of an aluminum halide per mol of cyclohexene employed in the reaction.

2. The method of making a monocyclohexyl-aromatic compound which comprises reacting a cyclohexene with a compound selected from the class consisting of aromatic hydrocarbons and chlorinated aromatic hydrocarbons in the presence of about 0.05 mol of aluminum chloride for each mol of cyclohexene used.

3. The method of making a monocyclohexyl chlorobenzene which comprises reacting cyclohexene with chlorobenzene in the presence of about 0.05 mol of aluminum chloride for each mol of cyclohexene used.

LAWRENCE F. MARTIN.
GERALD H. COLEMAN.